United States Patent [19]

Edwards

[11] Patent Number: 4,557,219

[45] Date of Patent: Dec. 10, 1985

[54] CHEWABLE TOY FOR ANIMAL

[76] Inventor: Philip L. Edwards, 14615 Klenk, Detroit, Mich. 48215

[21] Appl. No.: 665,410

[22] Filed: Oct. 26, 1984

Related U.S. Application Data

[62] Division of Ser. No. 540,987, Oct. 11, 1983, Pat. No. 4,513,014.

[51] Int. Cl.$^4$ .............................................. A01K 29/00
[52] U.S. Cl. ................................................... 119/29.5
[58] Field of Search ................. 119/29, 29.5; 128/136; 426/104, 132, 289, 512, 805

[56] References Cited

U.S. PATENT DOCUMENTS

| | | | |
|---|---|---|---|
| 3,071,476 | 1/1963 | Werft et al. | 426/132 X |
| 3,871,334 | 3/1975 | Axelrod | 119/29.5 |
| 4,419,372 | 12/1983 | Greene et al. | 426/805 X |

FOREIGN PATENT DOCUMENTS

| | | | |
|---|---|---|---|
| 2083217 | 12/1971 | France | 119/29 |
| 975333 | 11/1964 | United Kingdom | 426/805 |

*Primary Examiner*—Robert P. Swiatek
*Attorney, Agent, or Firm*—Neal A. Waldrop; Jay C. Taylor

[57] ABSTRACT

A super-tough molded elastomeric chewable polyurethane toy for an animal. The toy may be shaped to simulate a dog bone and to make swallowing difficult when being chewed. It is also chemically inert in the animal's digestive system and is characterized by moderate hardness, resilient deformability, large tensile strength and resistance to shearing. It is generally slightly heavier than water, but may be foamed or impregnated with air to float. The toy also makes use of a unique property of polyurethane whereby a surface-migrating flavoring pleasing to the animal is mixed with the polyurethane composition while the latter is in a liquid phase prior to being molded to the desired shape. Thus as the flavoring is chewed off or otherwise dissipated from the exterior surface of the toy, the flavoring is continuously replenished.

11 Claims, 4 Drawing Figures

4,557,219

CHEWABLE TOY FOR ANIMAL

This application is a division of application Ser. No. 540,987, filed Oct. 11, 1983, and now U.S. Pat. No. 4,513,014.

This invention relates to a chewable toy or simulated bone for an animal, which is highly resistant to destruction by being chewed and is harmless if swallowed, and in particular relates to such a toy comprising an aromatic flavored polyurethane appealing to the animal, and to a method for making the toy.

BACKGROUND AND OBJECTS OF THE INVENTION

Numerous chewable toys for animals fabricated from rubber, plastics, rawhide and the like have long been available for the purpose of massaging the gums and strengthening the teeth of the animal, but each such toy has been subject to various objections, such as the inherent bad taste of rubber, susceptibility to destruction when chewed, and hardness or brittleness, as for example when made from Nylon TM which could damage the animal's teeth. The rawhide "bone" has been in common use, but it disintegrates rapidly when chewed, and like some of the plastics used heretofore, large sections can be torn away and if swallowed can get caught in the dog's throat.

An important object of the present invention has been to provide an improved durable chewable toy or "bone" for pets, which avoids the above-noted objections, which may be molded from polyurethane to simulate a real bone having an elongated body with enlarged bifurcated ends to provide chewing protuberances for small dogs and curved exterior surfaces adapted to conform to and massage the gums of larger dogs, and wherein the elongated body curves in opposite directions from its mid-region to effect oppositely directed compound or three-dimensional curvatures, which in cooperation with the enlarged ends prevent accidental swallowing of the simulated bone by large dogs.

Another object is to take advantage of the unique physical properties of polyurethane to provide such a toy, which can be a ball or other shape as well as a simulated bone in appearance and which is molded from an elastomeric polyurethane to provide a super-tough toy highly resistant to chewing and in fact essentially indestructible by chewing except by very large dogs, wherein the polyurethane itself is odorless, tasteless, and chemically inert in the digestive system so as to be harmless if swallowed. The polyurethane has a moderate hardness durometer to assure the desired flexibility and compressibility in a chewable toy, so as to massage a pet's gums without undue wearing of the teeth and to provide a toy that can be caught in the air by a dog for example without breaking the dog's teeth, in contrast to similar bones of hard material such as Nylon TM which can chip a dog's teeth. On the other hand, the polyurethane also has large coefficients of tensile strength and resistance to shearing to enable the toy to be stretched twisted and compressed within the limits of its elasticity by sharp teeth and strong jaws without disintegrating while being chewed, so as to outlast comparable toys of rubber, rawhide and even Nylon TM, and has the resiliency to enable return of the toy essentially to its undeformed condition after being chewed.

Another object is to provide a molded polyurethane toy or "bone" of the above character impregnated with air bubbles so as to be lighter than water and useful for example in water games with a dog or for training a dog to retrieve. Although the aerated bone is more readily destroyed by chewing, it is somewhat softer and more spongy and is thus ideal for older dogs.

Another object is to provide an improved chewable polyurethane toy of the above character having a surface-migrating flavoring agreeable to the animal and uniformly distributed throughout the volume of the toy, whereby as the surface flavoring is removed during the chewing process, the flavoring is replaced at the surface by flavoring from the interior of the toy.

Another object is to provide an improved method of manufacturing such a toy wherein an aromatic extract such as catnip or a meat flavoring is added to and uniformly distributed throughout the polyurethane material to comprise a homogenous portion of the toy.

Another and more specific object is to add the aromatic flavoring extract during the initial formulation of the polyurethane, whereby the extract is thoroughly mixed with the components of the polyurethane, first during the mixing of said components during the initial formulation, and thereafter during the granulation and mixing of the polyurethane in preparation for the final molding operation. By virtue of the foregoing, a thorough mixing of the extract within the polyurethane is assured and the necessity of providing a specific mixing procedure for mixing the extract within the polyurethane is eliminated. Inasmuch as the components in the formulation of the polyurethane must be thoroughly mixed in any event, the same mixing procedure is utilized both for mixing the polyurethane components with themselves and for mixing the extract with the components. The flavoring extract is usually highly concentrated, such that thorough mixing is important. Otherwise localized concentrations of the extract can overpower the sensory nerves of the animal and effect a disagreeable reaction rather than the intended taste or aroma that is pleasing to the animal.

Where the extract loses its aroma or flavor in consequence of heating, the flavoring extract is initially added and thoroughly mixed with the granulated polyurethane when the latter is heated and melted immediately prior to the molding operation. A satisfactory distribution of the extract can be accomplished by such a procedure and the extract is only subjected to a single heating cycle, i.e., the heating required to melt the polyurethane prior to the molding. The extract is spared the heat of the exothermic reaction resulting from mixing the aforesaid components during the formulation of the polyurethane.

In some conventional molding operations, the polyurethane comprises two or more liquid components that are mixed by being fed simultaneously at measured rates directly into the mold. In such instances the liquid flavoring extract is likewise fed into the mold along with the liquid components to effect a thorough mixing of the liquid extract and components for the polyurethane in a single mold filling operation.

THE PRIOR ART

The prior art is replete with molded pet toys and dog bones, but the concept of utilizing the unique properties of polyurethane to provide a toy or dog bone as described herein, or of providing such a toy having a surface-migrating flavoring extract homogenously distributed throughout the polyurethane as a part of the toy, and the fabrication of the toy by mixing the flavoring extract with the liquid components of the polyurethane during the initial formulation of the latter, as described herein, is nowhere suggested by the art known to applicant.

U.S. Pat. No. 2,194,736, to Bruler, Jones, U.S. Pat. No. 2,610,851; Fisher, U.S. Pat. No. 3,104,648; and Axelrod, U.S. Pat. No. 3,871,334 are typical of the known art. Bruler, for example, discloses a "bone" molded from a porous elastic material such as rubber. A material that gives off an odor agreeable to a dog may be placed in a hollow part of the porous material. Jones, Fisher and Axelrod similarly disclose a toy of rubber or other resilient material, including Nylon TM and resin, that may be conventionally flavored to entice the dog. There is no hint in these patents of utilizing the superior characteristics of polyurethane to provide an essentially indestructible and harmless bone, nor of how the toy is flavored, except that it is conventionally flavored, meaning a surface coating or impregnation under pressure, as in Axelrod, which is a costly and time consuming procedure, or the insertion of aromatic pellets into a hollow chamber of a porous toy, which by reason of its porosity is also readily destroyed when chewed or gnawed.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF A PREFERRED EMBODIMENT

Figure 1:
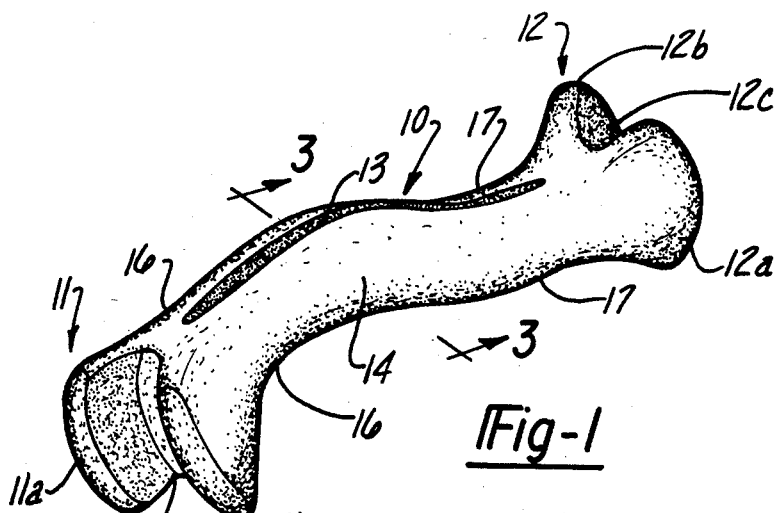
FIG. 1 is a perspective view of a dog bone embodying the present invention.
Figure 3:
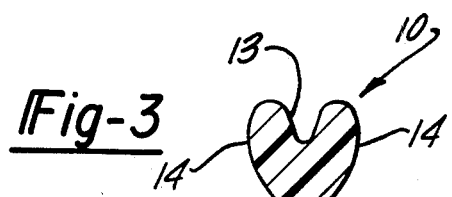
FIG. 3 is a transverse section through the mid-region of the bone of FIG. 1.

Referring to the drawings, a dog bone embodying the present invention comprises an elongated central portion 10 having enlarged opposite end portions 11 and 12 bifurcated to provide a pair of flared endwise enlarging projections 11a and 11b spaced by a notch 11c at the enlarged end 11, and similar flared endwise enlarging projections 12a and 12b spaced by a notch 12c at the opposite enlarged end 12. The mid-region at the upper or top portion of the bone in FIG. 1 is provided with an upwardly opening channel or groove 13 that extends the major length of the portion 10. From the upper portions of the walls of the groove 13, the lateral surfaces of the bone diverge from each other approximately to the longitudinal mid-regions 14 of the opposite lateral surfaces, which surfaces then converge downwardly toward each other to a centrally located lowermost or bottom ridge 15, thereby to provide a somewhat heart-shaped cross section, FIG. 3.

Figure 4:
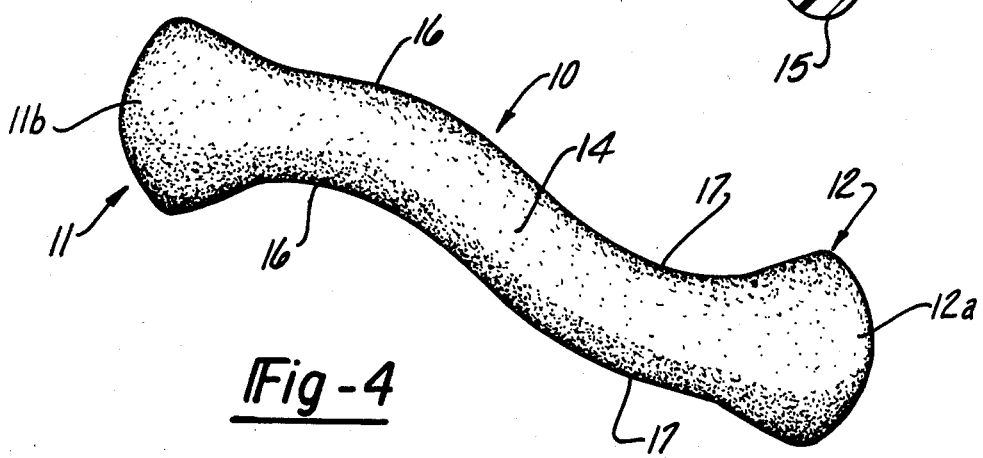
FIG. 4 is a side view of the bone of FIG. 1.

By comparing FIGS. 1 and 4, it may be observed that the bone curves three-dimensionally in oppositely directed compound curvatures from its transverse mid-region to its enlarged ends 11 and 12. From the aforesaid transverse mid-region in FIG. 1, the longitudinal portion 10 curves at 16 downwardly toward the end 11. Similarly the longitudinal portion 10 curves at 17 upwardly from its transverse mid-region toward the enlarged end 12. The concave surfaces of the curvatures 16 and 17 curve continuously with the surfaces of the flared end portion 11b and 12b respectively, whereas the convex surfaces of the curvature 16 and 17 recurve slightly at their junctures with the surface of the flared end portions 11a and 12. The upper surfaces of the end portions 11 and 12 curved upwardly and the lower surfaces of end portions 11 and 12 curve donwardly in the endwise directions. The complex curvature described provides a bone that is difficult to swallow. If one end of the bone does enter a dog's throat, it may be readily pulled out by the dog holding the enlarged outer or opposite end of the bone with the paws while pulling the head backward, which apparently is an instinctive reaction.

Figure 2:
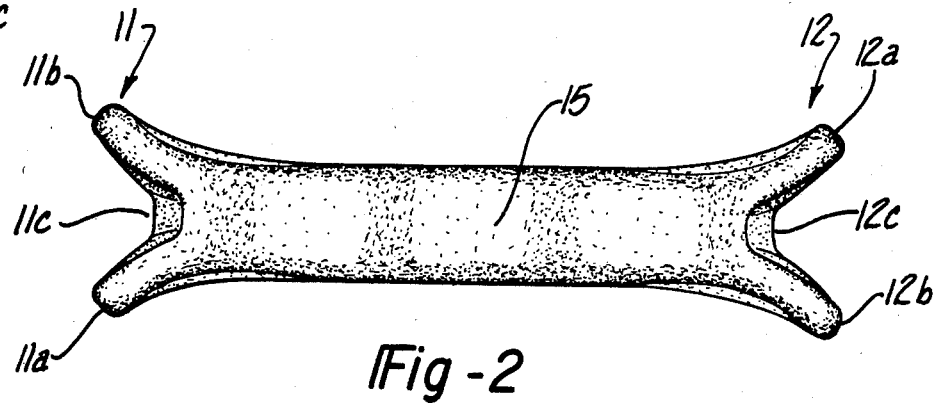
FIG. 2 is a bottom view of the bone of FIG. 1.

The paired bifurcated end portions 11a, 11b and 12a, 12b are flared endwise to provide chewable extensions that can be gripped in the mouth of a comparatively small dog. The total transverse sectional area of either pair of projections 11a, 11b, or 12a, 12b is approximately equal to the area of the transverse section through the longitudinal portion 10, FIG. 2. By virtue of the notches 11c and 12c, either of the paired extensions 11a, b or 12a, b can be bent resiliently toward each other in the chewing process within their limits of elasticity, and the parts will return to their undeformed shapes after being chewed. Also the bifurcated projections can be readily received between the jaws of a dog, and by virtue of the curvature of the bone 10 adjacent its end portions, the lateral and mesial surfaces of the bone will engage and massage both the labial and lingual gums of the dog during the chewing process.

The groove or channel 13 reduces the total crosssectional mass of the polyurethane material similarly to the action of the grooves 11c and 12c, and facilitates flexing of the upper portions of the bone portion 10 at opposite sides of the groove 13 to provide a satisfying crunching effect to the chewer even if the bone is fabricated from a comparatively hard elastomer that would otherwise have very little yieldability when subjected to a normal chewing force.

Although the bone shaped as described above can obviously be molded from any of the elastomer materials utilized heretofore for such toys, an important concept of the invention is the use of a preferred elastomer comprising a polyurethane having among other qualities the unique distinction of being essentially indestructible by ordinary chewing forces; will yield resiliently within its limits of elasticity and return to its undeformed condition when the deforming force is terminated; and is extremely resistant to shearing by sharp teeth that would normally disintegrate elastomers used heretofore, such as the various rubber-like compounds, resins, and polyethylenes.

Animal toys of various shapes and sizes, including the above-described bone shape, various other bone shapes, and spheres or balls have been formed in accordance with the present invention from polyurethanes having a hardness or durometer ranging between approximately 35 and 60 Shore D as measured by ASTM (American Society of Testing Materials) Test 2240; an ultimate tensile strength between approximately 20 and 25 MPa (Mega Pascals) measured by ASTM Test D 412; an ultimate elongation ranging between approximately 500% and 600%; a tensile strength between approximately 6.9 and 16.5 MPa at 100% elongation; and between approximately 10.3 and 19 MPa at 300% elongation; a tensile set of approximately 3% to 18% at 50% elongation; a tear strength of between approximately 80 and 140 kN/m (kilo Newtons per meter) measured by ASTM Test D 624-Die C; and a compression set of between approximately 30% and 40% at 70° C. over a 22 hour period.

Polyurethanes having physical properties within the ranges specified above are usually satisfactory for chewable animal toys and are preferred for typical situations. However, the durometer range can be widened to between 10 and 80 Shore D where desired, and such widening of the hardness range will obviously widen the ranges for other physical characteristics such as tensile strength, elongation, tensile set, tear strength, and compression set.

The preferred polyurethanes having the physical characteristics enumerated above are slightly heavier than water and have specific gravities ranging between 1.1 for the softer polyurethanes, and 1.2 for the harder polyurethanes. Another concept of the present invention is to provide a toy as described herein useful in water sports or for training an animal to retrieve. Accordingly foaming agents for employed or air bubbles are blown or worked into the polyurethane by conventional procedures during the molding operation to provide a floating toy lighter than water.

Although animals accustomed to gnawing and chewing will chew on polyurethane toys which in themselves are tasteless and odorless, another concept of this invention is to increase the attractiveness of such toys to animals by utilizing additional unique characteristics of the polyurethanes and to flavor the toy with flavoring or aromatic oils which are dispersed uniformly and preferably homogenously throughout the toy in accordance with the process described below to provide a flavor that will remain appealing to the animal without appreciable diminishing effectiveness essentially for the life of the durable polyurethane material of the toy.

Polyurethanes are characterized by the urethane linkage (—NH—C=O). This typical linkage is formed by the reaction of an isocyanate group (R—N=C=O) with a hydroxyl containing compound (R—OH). While reaction with a hydroxyl compound is primary, isocyanates will also react with any compound containing an active hydrogen atom. Therefore functional groups such as the urea, amide, allophanate, biuret, and other groups may become important parts of the polyurethane polymer. In addition, most of the hydroxyl containing compounds are polymers in themselves. These are generally polyethers and polyesters, but other hydroxyl containing polymers, such as castor oil, can be part of the polyurethane complex.

In formulating a urethane compound, there are several different types of materials that either must be or can be used. These materials can generally be classified into the following: isocyanates, polyols, chain extenders, catalysts, blowing agents, functional additives, fillers, and non-functional additives. All of these, with the exception of the fillers and non-functional additives, comprise the polymer network where their independent structures react into and become an integral part of the resultant urethane polymer. This polymer structure is responsible for the basic physical nature of the polyurethane, i.e., its strength, elasticity, toughness, resiliency, and other physical characteristics.

Fillers and non-functional additives do not enter into the polymer reaction, but do affect the physical nature of the final urethane compound. Although these latter additives are not reacted or chemically bound to the polymer structure, they are held by the polymer structure by physical entrapment and, in some cases, by secondary chemical association.

Examples of these latter additives are colorants or pigments, non-reactive blowing agents, fillers such as calcium carbonate, clays, mica, and others, and lubricants. Most of these additives are permanently locked into the polymer structure, but some are actually insoluble and incompatible in the urethane compound. The incompatibility might be due to the urethane groups present or to other of the many function groups preent. In any event, the insolubility of such additives causes the same to work gradually to the surface of the polyurethane.

Traditional examples of such surfacing of insoluble or incompatible components are referred to as "bloom" wherein a pigment or colorant is provided in a wax or oil-based carrier that migrates to the surface to form an off-color haze. The haze can generally be wiped off, but will return with time; and "self-lubrication" wherein an oil formulated into a polyurethane compound continually migrates to the surface. If the surface is cleaned, the oil will reappear in time.

Flavors or odors, hereinafter referred to as "aromatic extracts", are complex organic compounds that can be soluble in many oils. Some of the aromatic extracts function as surface-migrating substances. The incompatibility of the urethane compound and the aromatic extract could possibly be due to the extract's basic chemical structure, or to the greater solubility of the aromatic extract in its oil or wax carrier, which in turn is incompatible with the polyurethane and conveys the extract to the surface.

The migrating nature of the oil-based aromatic extract makes the flavored urethane unique. The aromatic extract can be added to many if not all plastics, but to be effective the molecules of the aromatic extract must be available at the surface of the chewable toy. In most plastics, when the flavoring molecules on the surface are removed, the flavor or aroma is lost regardless that many other flavoring molecules may still be locked in the plastic. In the flavored urethane, when the surface molecules of the flavoring are removed, they are replaced by new flavoring molecules migrating from the compound's interior.

The rate of migration is a function of various factors, including temperature and the polymer molecular activity. The temperature and molecular activity is increasing by the frictionally induced build-up of internal energy resulting from bending, flexing and compressing the toy. Therefore such actions as chewing and the body heat of the animal's mouth can increase the migration of the aromatic extract to the surface, thereby increasing the satisfaction of the chewer. An animal can learn that the harder it chews, the more satisfying will be the taste.

In the manufacture or fabrication of an animal toy embodying the present invention, the various above-noted components known to be required for the formulation of a polyurethane having the desired physical characteristics specified herein are mixed together in measured quantities while in a liquid phase, thereby to initiate an exothermic reaction resulting from the polymerization of the components. The initial reaction in the liquid phase requires but a few minutes until solidification takes place. During the initial mixing of the liquid components and while these are still in the liquid phase, the aromatic extract, usually in a wax or oil carrier, is added as a liquid or pulverized solid and also mixed thoroughly with the reacting components. The extract may be any of numerous flavoring extracts known to the art and incompatible with the polyurethane to effect the surface-migrating action as noted above. The flavoring itself can be a surface-migrating substance of the type described above, i.e., incompatible with the resulting urethane compound, or it may be highly soluble in its oil or wax carrier, which in turn must be non-compatible with the resulting urethane so as to migrate with the flavoring to the surface of the toy. The incompatibility referred to herein thus pertains to surface-migrating substances that apparently do not combine chemically with the components that form the polyurethane.

The flavor or aroma of the extract will, of course, be agreeable to the animal for which the toy is intended and may impart a meat or catnip flavor or aroma, for example. Only a small quantity of the extract is required, amounting usually to about one-half of a percent by weight of the total composition. Accordingly, if a wax carrier is employed the small quantity of wax is quickly melted by the reaction heat and dispersed uniformly throughout the liquid components in the reaction and is thus distributed homogenously throughout the resulting solidified polyurethane.

The solidified polyurethane is then generally cured for a few days to assure stabilization of the reaction or polymerization process, although the reaction can be adjusted by means known to the art to permit stabilization more rapidly. The cured polyurethane is then ground into granules and fed preferably to an injection molding machine wherein the granules are heated and melted and finally injected under pressure in a liquid form into an injection molding die. Although the toy in many shapes can be molded conventionally at atmospheric pressure, conventional injection molding is preferred because of the speed of the molding cycle and the versatility of the process that enables the formation of essentially any shape desired.

In the process known as Reaction Injection Molding (RIM) the composition of the polyurethane is selected to avoid the aforesaid few days curing time. In such a process the liquid components for the polyurethane are thoroughly mixed by being simultaneously injected at measured rates into a mixing head of an injection molding machine from which the mixed components are then forced into a die to form the finished chewable toy. In such a process, the flavoring extract is also added at a measured rate into the mixing head simultaneously with other components for the polyurethane. In a variation of RIM known as casting, the flavoring extract and liquid components are poured simultaneously into an open mold at atmospheric pressure, whereby the components and extract are thoroughly mixed as they are poured into the mold that forms the chewable toy. In the latter process, as well as in the RIM process, the primary curing takes place in the mold and may continue for a limited time after the toy is removed from the die or mold.

Alternatively to adding the flavoring extract during the mixing of the initial liquid components from which the polyurethane is formulated, the extract can be added to the cured granules and thoroughly mixed therewith prior to the injection molding process. Such a procedure requires an additional mixing procedure which is avoided in the first method described above and for that reason is usually not preferred. In certain instances, as for example where the flavoring tends to be decomposed by the heat of the exothermic reaction, the second alternative procedure may be preferred.

It is apparent from the foregoing that a particularly durable, long-lasting chewable toy for an animal has been provided in combination with a flavoring that is satisfying to the animal and capable of being replenished at the surface of the toy over an extended time period which for all practical purposes will usually equal the life of the toy. The toy is non-toxic, has superior toughness, resistance to shearing, and excellent elasticity that enables it to return to its original shape after being chewed. The polyurethane can be comparatively soft, can be caught in the air by a dog without breaking a tooth, does not splinter, and cannot be torn apart except by unusually large dogs. Even if a part is pulled loose by a dog, it does not present sharp edges and passes readily through the digestive system intact and without harm to the dog.

In regard to brittleness, polyurethanes retain their elasticity or chewability for years and resist "drying out" or hardening and becoming brittle, as compared to rubber-like materials or resins used heretofore. Likewise, by virtue of the surface-migrating aspect of the flavoring extract dispersed uniformly throughout the toy, the extract does not dry out within the body of the toy and is continuously replenished at the surface of the toy if the surface extract dries during an extended time when the toy is not in use.

I claim:
1. The method of manufacturing a flavored polyurethane chewable toy for an animal, the steps of
   (a) formulating liquid components in measured quantities required for a selected polyurethane having a predetermined set of physical characteristics,
   (b) initiating an exothermic reaction by thoroughly mixing said components to provide the fluid composition required for said polyurethane,
   (c) curing the composition by allowing it to polymerize and harden to become said polyurethane,
   (d) granulating the hardened and cured polyurethane,
   (e) heating the granulated polyurethane to melt the same to provide a fluid composition for molding,
   (f) thoroughly mixing a measured quantity of a surface-migrating flavoring extract in the liquid composition during at least one of steps (b) and (e),
   (g) thereafter providing a mold and molding the flavored composition in said mold to form said chewable toy.

2. The method of claim 1 wherein said extract is appealing to a dog and said mold is designed to form a simulated bone.

3. The method of claim 2, wherein said mold is designed to form said simulated dog bone having an elongated body and enlarged opposite end portions, each said enlarged end portion bifurcating laterally and extending endwise from the associated end of said elongated body for approximately one-third the length of said elongated body from the mid-region thereof to said associated end, the total transverse sectional area of the two bifurcated end portions at either end of said bone being on the order of magnitude of the transverse sectional area of said longitudinal body, said elongated body being generally heart shaped in transverse section to provide a central upwardly opening channel extending along the upper surface of said body and a central ridge extending along the lower surface of said body.

4. The method of claim 1, wherein said extract is added during step (d).

5. The method of claim 4, wherein said mold is provided to form a simulated dog bone having an elongated body and enlarged opposite end portions; said bone having opposite lateral surfaces and upper and lower surfaces curving in compound curvatures; said curvatures comprising said upper and lower surfaces of said elongated body extending in one direction from the mid-region of said body curving upwardly, the upper and lower surfaces of said body extending in the opposite direction from said mid-region curving downwardly, the upper and lower surfaces of the end portion in said one direction curving upwardly and downwardly respectively, the last named upper surface comprising a continuation of the upward curvature of said upper surface of said body, the last named lower surface recurving downwardly from the upward curvature of said lower surface of said body, the upper and lower surfaces of the end portion in said opposite direction curving upwardly and downwardly respectively, the last named upper surface recurving upwardly from the downward curvature of said upper surface of said body, and the last named lower surface comprising a continuation of the downward curvature of said lower surface of said body.

6. The method of claim 5, wherein said mold is provided to form said simulated dog bone having each said enlarged end portion bifurcating laterally and extending endwise from the associated end of said elongated for approximately one-third the length of said bone from said mid-region to said associated end.

7. The method of claim 5, wherein said mold is provided to form said elongated body generally heart shaped in transverse section to provide a central upwardly opening channel extending along said upper surface and a central ridge extending along said lower surface.

8. The method of claim 7, wherein said mold is provided to form said simulated dog bone having the total transverse sectional area of the two bifurcated end portions at either end of said bone approximately equal to the transverse sectional area of said longitudinal body.

9. The method of claim 1 wherein the molding step (c) also comprises the step of foaming said flavored composition to provide a lighter than water and softer toy.

10. The method of claim 1 wherein the molding step (c) also comprises the step of foaming said flavored composition to provide a lighter than water and softer toy.

11. The method of manufacturing a flavored polyurethane chewable toy for an animal, the steps of
(a) initiating an exothermic reaction by thoroughly mixing measured quantities of separate compositions including an isocynate composition (R—N=C=O) and a hydroxyl composition (R—OH) capable of polymerization to a polyurethane having predetermined physical characteristics,
(b) thoroughly mixing in said exothermic reaction a measured quantity of a surface-migrating flavoring extract incompatable with the polymerized polyurethane,
(c) curing the mixture by allowing polymerization of said composition to said polyurethane, and
(d) molding the polyurethane to form said chewable toy.

* * * * *